UNITED STATES PATENT OFFICE.

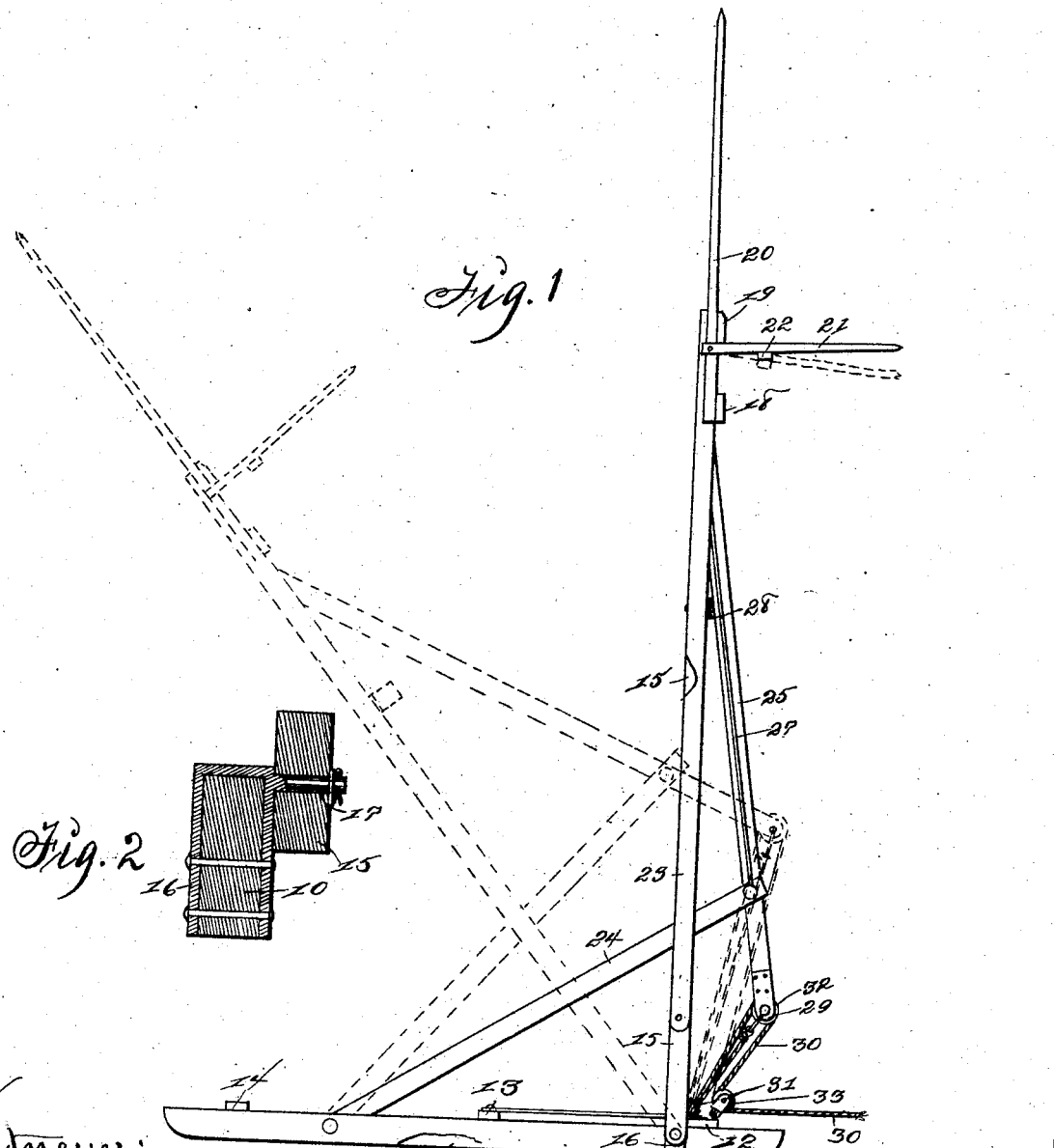

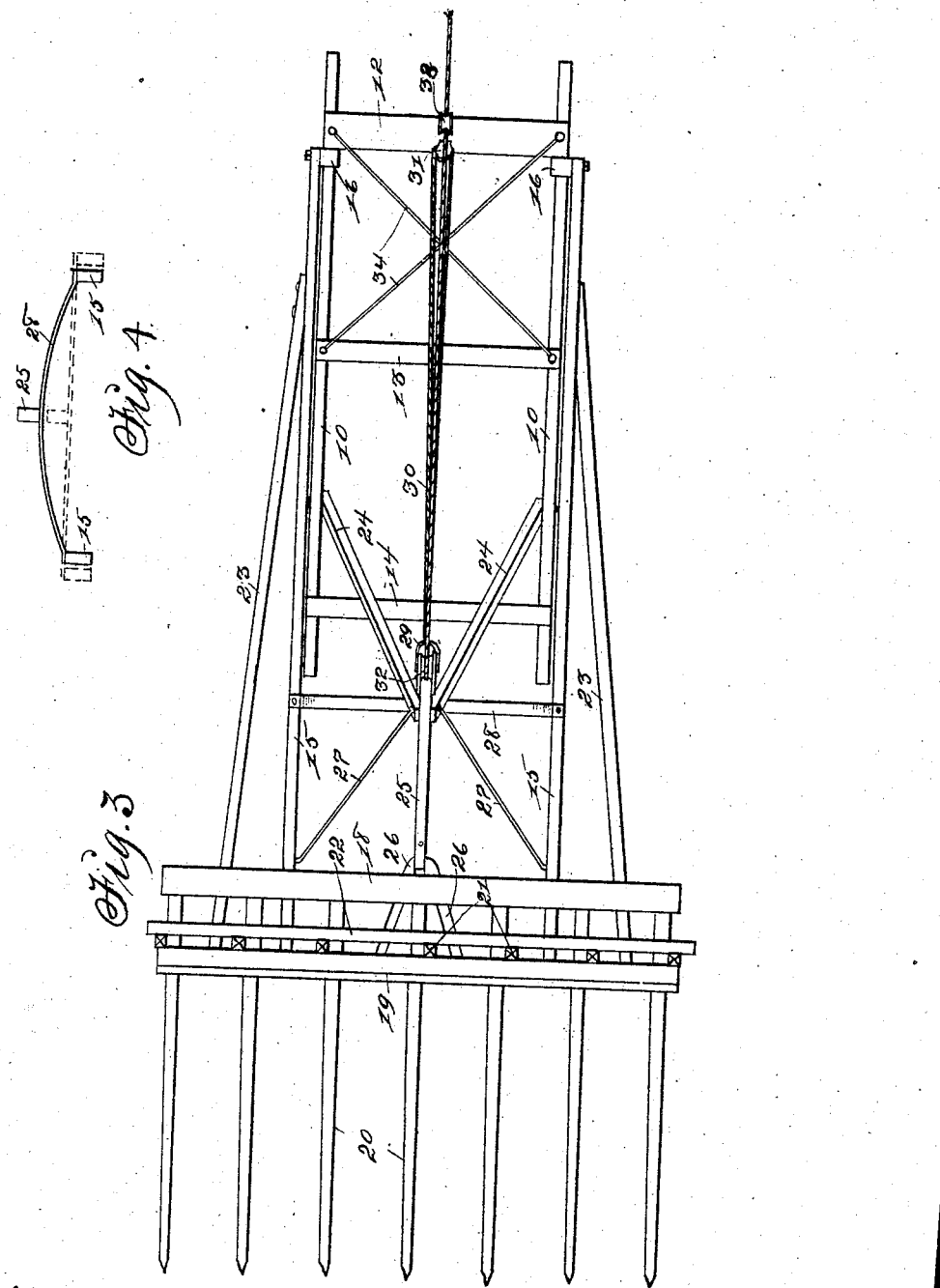

LEROY J. LINDSAY, OF OTTUMWA, IOWA, ASSIGNOR TO C. P. BARRICKMAN, OF SEYMOUR, IOWA.

HAY-STACKER.

No. 850,765.

Specification of Letters Patent.

Patented April 16, 1907.

Application filed July 12, 1906. Serial No. 325,946.

*To all whom it may concern:*

Be it known that I, LEROY J. LINDSAY, a citizen of the United States, and a resident of Ottumwa, in the county of Wapello, State of Iowa, have invented a new and useful Improvement in Hay-Stackers, of which the following is a specification.

My object is, first, to provide means for operating a hay-stacker with less power than heretofore; second, to reduce the length of rope in a tackling for lifting the loaded fork of a stacker; third, to reduce the distance that a horse must walk for lifting the loaded fork; fourth, to operate the fork quicker than heretofore for saving time and expense in stacking hay, &c.; fifth, to utilize a leaf-spring as a stop for arresting and restricting the forward motion of the fork as it throws off hay upon a stack and at the same time store power in the spring for starting the fork backward and downward when unloaded.

My invention consists in the construction, arrangement, and combination of parts, as hereinafter set forth, pointed out in my claims, and illustrated in the accompanying drawings, in which—

Figure 1 is a side elevation of the stacker and shows the fork-carrier in a perpendicular position. Dotted lines indicate the movements of the fork and carrier by means of tackling and a lever pivoted to a movable fulcrum. Fig. 2 is an enlarged sectional view that shows how the uprights of the fork-carrier are pivotally connected with the side pieces of the base. Fig. 3 shows the fork-carrier folded flat upon the base. Fig. 4 is a detail view that shows a leaf-spring fixed to the top portions of the uprights of the fork-carrier to be engaged and actuated by the lever that lifts the fork and carrier as required to elevate hay, &c., and throw it off upon a stack.

The numerals 10 designate the parallel side pieces of the base. They are connected by cross-pieces 12, 13, and 14, fixed thereto.

The mating uprights 15 of the fork-carrier are pivoted to the sides of the base-pieces 10 contiguous to the cross-piece 12 by means of castings 16, that stride the base-pieces 10, and have integral journals 17, that project horizontally outward. The castings serve as reinforcements to the structure and are fixed to the base-pieces 10 by means of bolts, as shown in Fig. 2. To the top portions of the uprights is fixed a fork composed of cross-bars 18 and 19 and fixed tines 20 and adjustable tines 21, pivoted to the tines 20 and connected by a cross-bar 22, as shown in Figs. 1 and 2, or in any suitable way. Braces 23 are fixed to the lower end portions of the uprights 15 and to the cross-bars 18 and 19 of the fork.

A fulcrum 24, composed of two straight pieces, is pivoted to the rear end portion and inside of the base-pieces 10 to normally rest flat upon the base, and a lever 25 is pivotally connected with their top ends, and the end of its long arm is pivotally connected with the fork by means of bearers 26, preferably made of angle-irons fixed to the cross-bars 18 and 19.

Stay-rods 27 are pivoted to the top of the movable fulcrum 24 and the upper end portions of the uprights 15. A leaf-spring 28 is fixed to the upper end portions of the uprights 15.

A clevis 29 is pivoted to the end of the short arm of the lever 25 and a rope 30 fixed thereto and extended over a direction-pulley 31, connected with the center of the cross-bar 12 at the front end of the base, and from thence over a direction-pulley 32 at the end of the short arm of the lever and then down again and under a pulley 33, connected with the center of the cross-bar 12 of the base, as required for hitching a horse thereto.

Cross-rods 34 are fixed to the cross-pieces 12 and 13 of the base to strengthen the base.

In the practical use of my invention when a horse is hitched to the end of the rope 30 and the fork-carrier and fork are flat upon the ground and the fork is loaded the fulcrum 24 and the lever 25 will be in an upright position, and when the horse walks away from the base of the stack his pulling force will be augmented by the tackling, as it is thereby applied to the short arm of the lever 25 for lifting the loaded fork and carrier, and as the fork and carrier are raised the pivoted fulcrum 24 will swing forward, as indicated by dotted lines in Fig. 1, until the uprights 15 of the fork-carrier reach a perpendicular position. By means of the lever, fulcrum, and tackling a rapid upward movement of the loaded fork is thus accomplished in less time and with less power than heretofore, and the momentum acquired by the loaded fork will strike the spring 28, and the motion of the fork will be arrested thereby, and the sudden stop of the fork will throw off the load from the rake. The lateral yielding of the uprights 15, to which the ends of the spring are fixed, allows the spring to straighten and power to be stored in the spring and also in the uprights as they are bent, and then recoil force, when the load has been thrown off the fork will start the fork and carrier backward as required to be lowered again, and thus the speed of the operation of stacking hay, &c., is accelerated and power, time, and labor saved in doing the work.

Having thus set forth the purposes of my invention, its construction, and manner of use, the practical operation and utility thereof is obvious.

What I claim as new, and desire to secure by Letters Patent, is—

1. In a hay-stacker, a flat base, a fork-carrier consisting of two mating uprights pivoted to the front end portion of the base a leaf-spring fixed to the upper end portions of the uprights, a fork-carrier uprights, a fulcrum pivoted to the rear end portion of the base, a lever pivoted to the fulcrum and pivotally connected with the fork and tackling connected with the base and the short arm of the lever, to operate as set forth.

2. In a hay-stacker, a flat base a fork-carrier pivoted to the end portion of the base, a fork fixed to the top of the fork-carrier, a fulcrum pivoted to the base, a lever pivoted to the fulcrum and pivotally connected with the fork and tackling connected with the base and the short arm of the lever and a leaf-spring fixed to the uprights of the rake-carrier, to operate as set forth.

3. In a hay-stacker, a flat base, a casting having an integral journal fixed to the side and end portion of the base and an upright of a fork-carrier pivoted to the journal to swing in a vertical plane.

4. A hay-stacker comprising, a base composed of two parallel sides and a plurality of cross-bars fixed to the sides, a rake-carrier composed of two mating uprights pivoted to the base, a leaf-spring fixed to the mating uprights, a fork fixed to the end portions of the uprights, a fulcrum composed of two mating parts pivoted to the sides of the base, lever-bearers fixed to the fork, a lever pivoted to the fulcrum and its long arm pivoted to the lever-bearers, a rope connected with the short arm of the lever, a direction-pulley at the center of a cross-bar at the end of the base, a pulley at the end of the short arm of the lever and a second pulley at the center of the said cross-bar, arranged and combined for raising and lowering the fork-carrier and fork as set forth.

LEROY J. LINDSAY.

Witnesses:
W. A. HOCKETT,
WM. CUPPLY.